United States Patent
Amasaki et al.

(10) Patent No.: US 10,361,465 B2
(45) Date of Patent: Jul. 23, 2019

(54) SECONDARY BATTERY

(71) Applicant: HITACHI, LTD., Tokyo (JP)

(72) Inventors: Shimpei Amasaki, Tokyo (JP); Yusuke Kaga, Tokyo (JP); Kazuaki Naoe, Tokyo (JP); Makoto Abe, Tokyo (JP); Etsuko Nishimura, Tokyo (JP); Akihiko Noie, Tokyo (JP)

(73) Assignee: HITACHI, LTD., Tokyo (JP)

( * ) Notice: Subject to any disclaimer, the term of this patent is extended or adjusted under 35 U.S.C. 154(b) by 231 days.

(21) Appl. No.: 15/460,422

(22) Filed: Mar. 16, 2017

(65) Prior Publication Data

US 2018/0090794 A1 Mar. 29, 2018

(30) Foreign Application Priority Data

Sep. 27, 2016 (JP) ................................. 2016-188036

(51) Int. Cl.

| | |
|---|---|
| *H01M 2/08* | (2006.01) |
| *H01M 2/18* | (2006.01) |
| *H01M 10/18* | (2006.01) |
| *H01M 10/02* | (2006.01) |
| *H01M 10/42* | (2006.01) |
| *H01M 10/0525* | (2010.01) |
| *H01M 10/056* | (2010.01) |

(Continued)

(52) U.S. Cl.
CPC ....... *H01M 10/4235* (2013.01); *H01M 2/145* (2013.01); *H01M 2/1646* (2013.01); *H01M 2/1673* (2013.01); *H01M 10/0418* (2013.01); *H01M 10/052* (2013.01); *H01M 10/056* (2013.01); *H01M 10/0525* (2013.01); *H01M 10/0585* (2013.01); *H01M 10/127* (2013.01); *H01M 10/0568* (2013.01); *H01M 2004/029* (2013.01); *H01M 2300/0091* (2013.01)

(58) Field of Classification Search
None
See application file for complete search history.

(56) References Cited

U.S. PATENT DOCUMENTS

2016/0344006 A1* 11/2016 Ota .................... H01M 4/13

FOREIGN PATENT DOCUMENTS

| JP | 2005-183073 A | 7/2005 | |
| JP | 2005183073 | * 7/2005 | .............. H01M 2/08 |
| JP | 2005-310667 A | 11/2005 | |

OTHER PUBLICATIONS

English translation of JP2005183073 (Year: 2005).*

* cited by examiner

*Primary Examiner* — Yoshitoshi Takeuchi
(74) *Attorney, Agent, or Firm* — Baker Botts L.L.P.

(57) ABSTRACT

A secondary battery is disclosed. The secondary battery has a bipolar electrode, an electrolyte layer, and a porous insulator. The bipolar layer includes a positive electrode layer formed on one surface of a collector foil and a negative electrode formed on the other surface of the collector foil. The electrolyte layer is famed at least on a surface of at least one of the positive electrode layer and the negative electrode layer. The porous insulator is formed to a lateral surface of at least one of the positive electrode layer, the negative electrode layer, and the electrolyte layer. The electrolyte layer is laminated by at least one layer relative to the bipolar electrode to configure a bipolar battery. The porous insulator also includes an inorganic particle and a reactive agent for lowering a fluidity of the liquid electrolyte bleeding from the electrolyte layer.

7 Claims, 5 Drawing Sheets

(51) Int. Cl.
*H01M 2/14* (2006.01)
*H01M 2/16* (2006.01)
*H01M 10/04* (2006.01)
*H01M 10/052* (2010.01)
*H01M 10/0585* (2010.01)
*H01M 10/12* (2006.01)
H01M 4/02 (2006.01)
H01M 10/0568 (2010.01)

SECONDARY BATTERY

CLAIM OF PRIORITY

The present application claims priority to Japanese Patent Application No. 2016-188036 filed on Sep. 27, 2016, the content of which is hereby incorporated by reference into this application.

BACKGROUND OF THE INVENTION

(1) Field of the Invention

The present invention relates a secondary battery.

(2) Description of the Related Art

In general, a bipolar battery used as a secondary battery has a structure of laminating a bipolar electrode having a positive electrode layer and a negative electrode layer formed on one surface of a collector foil and an electrolyte layer. Since the bipolar battery having such a structure can be connected in series in a battery cell, a high voltage can be attained without external connection of the battery cells. Accordingly, the bipolar battery has no requirement of external connection parts for attaining high voltage, and this is effective as a technique for improving the power density or energy density.

Relevant art includes, for example, Japanese Patent Application Laid-Open No. 2005-310667 and Japanese Patent Application Laid-Open No. 2005-183073.

SUMMARY OF THE INVENTION

As the electrolyte of the bipolar battery, electrolytes of a secondary battery, typically represented by lithium ion batteries, for example, solid electrolytes, semi-solid electrolytes, pseudo solid electrolytes, and gel electrolytes (hereinafter referred to collectively as quasi-solid electrolytes) are used.

Since the quasi-solid electrolytes contain a liquid electrolyte but use solids or high molecular materials, the quasi-solid electrolytes have a feature of having no or less fluidity. Then, the quasi-solid electrolytes sometimes bleed out the liquid electrolyte when pressed excessively.

When the quasi-solid electrolyte is used as the electrolyte for the bipolar battery, the bleeding liquid electrolyte extends around the collector foil of the bipolar electrode and sometimes stagnates at the periphery of the bipolar electrode. As a result, a positive electrode and a negative electrode famed in one collector foil are short-circuited (causing liquid junction) due to the liquid electrolyte stagnating around the positive electrode and the negative electrode. Such liquid junction may deteriorate the battery performance.

Further, it has been known that charge and discharge of a battery evolves a gas. A gas evolution occurs upon initial charge due to the formation of electrode membrane, as well as the electrolyte is decomposed although slightly during charge and discharge subsequent to the initial charge. When the gas stagnates between the electrodes, the distance between the electrodes is extended to cause deterioration of the battery performance.

Japanese Patent Application laid-Open No. 2005-310667 describes a bipolar battery having an absorption layer at the periphery of the bipolar electrode for absorbing the liquid electrolyte. The absorption layer may prevent the liquid junction to some extent caused by stagnation of the liquid electrolyte at the periphery of the bipolar electrode. However, the absorption layer is formed by densely coating a film-like or particulate polymeric material. The polymeric material swells upon absorption of the liquid electrolyte. When the polymeric material is formed densely, the polymeric material is further swollen. Accordingly, the polymeric material, either film-like or particulate, may clog space between the electrodes to hinder the discharge of the gas to the outside of the gap between the space of the electrodes.

Japanese patent Application Laid-Open No. 2005-183073 describes a bipolar battery having an insulative porous member formed at least to a portion of the insulation layer disposed to the periphery of the bipolar electrode. The porous member may prevent liquid junction caused by stagnation of the liquid electrolyte to the periphery of the bipolar electrode to some extent. However, the porous member is famed of woven or non-woven fabrics and a resin less wetting to the liquid electrolyte is used. By the way the resin deforms thermally (for example, polyolefinic resin melts at about 130 to 160° C.) to sometimes clog the pores. Therefore, the resin when exposed even once to a high temperature circumstance, hinders discharge of the gas to the outside of the space between the electrodes.

As described above, the liquid junction caused by stagnation of the liquid electrolyte at the periphery of the bipolar electrode may be possibly prevented to some extent by Japanese Patent Application Laid-Open Nos. 2005-310667 and 2005-183073 but it is difficult to prevent gas stagnation between the electrodes.

Then, the present invention intends to provide a secondary battery capable of preventing liquid junction caused by stagnation of the liquid electrolyte at the periphery of the bipolar electrode, as well as preventing the gas stagnation between the electrodes.

The present invention provides, in one aspect, a secondary battery including: a bipolar electrode including a positive electrode layer formed on one surface of a collector foil and a negative electrode formed on the other surface of the collector foil, an electrolyte layer famed at least on a surface of at least one of the positive electrode layer and the negative electrode layer, and a porous insulator formed to a lateral surface of at least one of the positive electrode layer, negative electrode layer and the electrolyte layer, wherein the electrolyte layer is laminated by at least one layer relative to the bipolar electrode to configure a bipolar battery, and wherein the porous insulator includes an inorganic particle and a reactive agent for lowering a fluidity of the liquid electrolyte bleeding from the electrolyte layer.

DESCRIPTION OF THE ACCOMPANYING DRAWINGS

FIG. 3A to FIG. 3C are schematic views illustrating a method of manufacturing the secondary battery according to the first embodiment of the present invention;

FIG. 5A to FIG. 5C are schematic views illustrating a method of manufacturing the secondary battery according to a second embodiment of the present invention.

DETAILED DESCRIPTION OF THE PREFERRED EMBODIMENTS

Preferred embodiments of the present invention are to be described specifically with reference to the drawings.

First Embodiment

A first embodiment of the present invention is to be described with reference to FIG. 1 to FIG. 4. First, the configuration of a secondary battery according to a first embodiment of the present invention is to be described.

Figure 1:
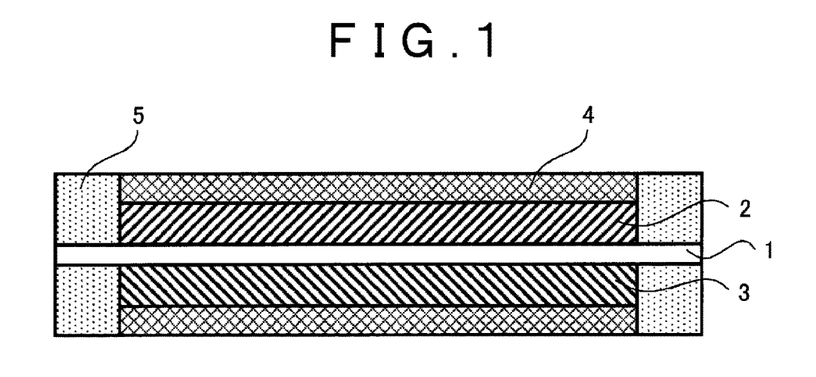
FIG. 1 is a schematic cross sectional view illustrating the configuration of a secondary battery according to a first embodiment of the present invention.

As illustrated in FIG. 1, a positive electrode layer 2 is formed on one surface and a negative electrode layer 3 is formed on the other surface of a collector foil 1. A semi-solid electrolyte layer 4 is famed at the surface of the positive electrode layer 2 and the negative electrode layer 3. Then, a porous insulator 5 that can prevent both the gas stagnation and the liquid junction is formed at the periphery of the positive electrode layer 2, the negative electrode layer 3, and the semi-solid electrolyte layer 4.

Thus, the positive electrode layer 2 is formed on one surface and the negative electrode layer 3 is formed the other surface of the collector foil 1 to form a bipolar electrode. Then, the bipolar battery is formed by laminating at least one semi-solid electrolyte layer 4 to the bipolar electrode. Then, the secondary battery is famed by including at least one such bipolar batteries.

Figure 2:
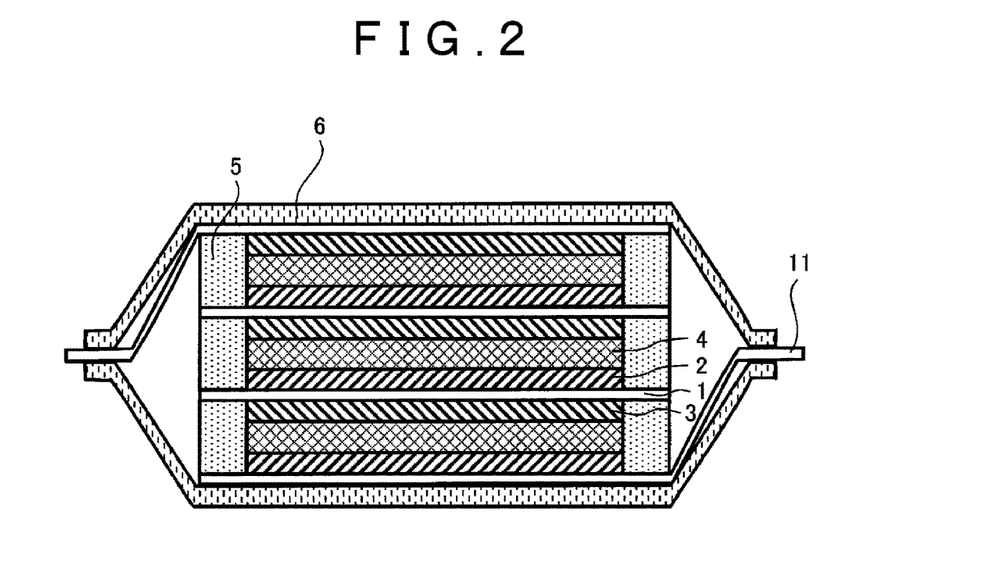
FIG. 2 is a schematic cross sectional view illustrating the configuration of the secondary battery according to the first embodiment of the present invention, which is a view illustrating the configuration of stacking a plurality of bipolar batteries in the secondary battery.

Then, the configuration of the secondary battery in which the bipolar batteries are stacked in plurality in the secondary battery is to be described. In FIG. 2, two bipolar batteries are stacked.

The secondary battery illustrated in FIG. 2 comprises bipolar batteries stacked by two and surrounded by an outer case 6. Electrode terminals 11 are led out of the outer case 6. The porous insulator 5 that can prevent both the gas stagnation and the liquid junction is famed between the collector foils 1. For the outer case 6, an aluminum laminate film or the like can be used. In FIG. 2, a structure of serially stacking two bipolar batteries electrically has been explained, but a bipolar battery and usual positive electrode layer 2 and negative electrode layer 3 of a non-bipolar battery may be electrically stacked in parallel.

Then, examples of respective constituent materials forming the secondary battery are to be described. First, materials for the semi-solid electrolyte are to be described.

The semi-solid electrolyte 4 comprises a liquid electrolyte and a carrier for the electrolyte, in which the liquid electrolyte is adsorbed at the surface of the carrier. A non-aqueous liquid electrolyte is used for the liquid electrolyte. For examples, a lithium ion battery is a battery using a Li salt for the electrolyte salt. Lithium is a strong reducing agent and vigorously reacts with water to evolve a hydrogen gas. Accordingly, an aqueous solution cannot be used for the liquid electrolyte. Therefore, non-aqueous electrolyte is used for the liquid electrolyte in the lithium ion battery.

Specifically, for the electrolyte salts, Li salts such as $(CF_3SO_2)_2NLi$, $(SO_2F)_2NLi$, $LiPF_6$, $LiClO_4$, $LiAsF_6$, $LiBF_4$, $LiB(C_6H_5)_4$, $CH_3SO_3Li$, and $CF_3SO_3Li$, or mixture thereof can be used. For the solvent of the non-aqueous liquid electrolyte, organic solvent such as tetraethylene glycol dimethyl ether, triethylene glycol dimethyl ether, ethylene carbonate, dimethyl carbonate, ethylmethyl carbonate, propylene carbonate, diethyl carbonate, 1,2-dimethoxy ethane, 1,2-diethoxy ethane, γ-butyrolactone, tetrahydrofuran, 1,3-dioxolane, 4-methyl-1,3-dioxalane, diethyl ether, sulfolane, methyl sulfolane, acetonitrile, and propionitrile, or liquid mixture thereof can be used.

As the carrier for adsorption of the liquid electrolyte, particles are used. Since it is preferred that the particle surface area per unit volume is larger for increasing the adsorption amount of the electrolyte, fine particles are preferred. The material for the fine particles can include, for example, silicon dioxide, aluminum oxide, titanium dioxide, zirconium oxide, polypropylene, polyethylene, or mixtures thereof but they are not restrictive. Further, in the first embodiment, the semi-solid electrolyte material has been described as an example, but other quasi-solid electrolyte materials can also be used.

The semi-solid electrolyte layer 4 has a function as a spacer that provides insulation between the positive electrode layer 2 and the negative electrode layer 3 while preventing electric contact between the electrodes, and permits the lithium ions to pass through the semi-solid electrolyte layer 4. The semi-solid electrolyte layer 4 may be formed by coating on the surface of the electrode or by forming as a self-standing film and then laminating the film on the surface of the electrode. The semi-solid electrolyte layer 4 comprises a semi-solid electrolyte and a binder. The constituent elements of the semi-solid electrolyte is as described above. As the binder, there can be used, for example, polyvinylfluoride, polyvinylidenefluoride (PVDF), polytetrafluoroethylene, polyimide, styrene-butadiene rubber, or mixtures thereof.

The positive electrode layer 2 is formed by coating a positive electrode mix comprising a positive electrode active substance, a binder, a conduction aid, and a semi-solid electrolyte on the collector foil 1. The positive electrode active substance includes, for example, lithium cobaltate, lithium nickelate, and lithium manganite but they are not restrictive. Specifically, the positive electrode active substance is a material capable of intercalating or de-intercalating lithium, which may be a lithium-containing transition metal oxide intercalated with a sufficient amount of lithium. The transition metal may be an element, for example, manganese (Mn), nickel (Ni), cobalt (Co), and iron (Fe) or a material comprising two or more transition metals as main ingredients.

Further, also crystal structures such as spinel crystal structure and layered crystal structure are not particularly restricted so long as the structure can intercalate or deintercalate lithium ions. Further, materials in which transition metals and lithium in the crystals are partially substituted with elements such as Fe, Co, Ni, Cr, Al, and Mg and materials in which elements such as Fe, Co, Ni, Cr, Al, and Mg are doped in the crystal may be used as the positive electrode active substance. As the binder, polyvinylfluoride, polyvinylidenefluoride, polytetrafluoro ethylene, etc. can be used, for example. The semi-solid electrolyte 4 used for the positive electrode layer 2 is as has been explained for the material of the semi-solid electrolyte described above, the particles used as the carrier may also be the condition aid.

The negative electrode layer 3 is formed by coating a negative electrode mix comprising a negative electrode active substance, a binder, a conduction aid, and a semi-solid electrolyte on the collector foil 1. The negative electrode active substance, includes, for example, a crystalline carbon material and an amorphous carbon material, but they are not restrictive. Specifically, the negative electrode active substance may be any of materials capable of intercalating or de-intercalating lithium ions, and carbon materials such as natural graphite, various artificial graphite, and coke, oxides such as silicon oxide, niobium oxide, and titanium oxide, materials forming alloys with lithium typically represented by silicon, tin, germanium, lead, and aluminum, or mixtures thereof.

Then, with reference to their particulate forms, various particulate shapes such as flaky, spherical, fibrous, and lumpy forms are applicable. For the binder, for example, polyvinylfluoride, polyvinylidenefluoride (PVDF), polytetrafluoroethylene, polyimide, styrene-butadiene rubber, or mixtures thereof can be used. The semi-solid electrolyte 4 used for the negative electrode layer 3 is as has been described above to the material for the semi-solid electrolyte 4, and the particles used as the carrier may also be a conduction aid. For example, metal foil, mesh metals, etc. comprising conductive metals such as stainless steel, aluminum, and copper are used for the collector foil 1.

The porous insulator 5 that can prevent both the gas stagnation and the liquid junction comprises insulative inorganic particles, a reaction agent for lowering the fluidity of the liquid electrolyte and a binder (to be described specifically later). The porous insulator 5 may be formed by coating or may be formed as a self-standing film, which is then adhered to the collector foil 1. As the inorganic insulative particles, silicon dioxide, aluminum oxide, titanium dioxide, zirconium oxide, or mixtures thereof can be used. With a view point of preventing liquid junction, it is desirable to increase the adsorption amount for the bleeding electrolyte, and the inorganic insulative particles are preferably fine particles.

Any reaction agent having an effect of increasing the viscosity of the liquid electrolyte can be used for lowering the fluidity of the liquid electrolyte, and Li salts, Na salts, K salts and mixtures thereof can be used. Such salts interact with organic solvent molecules in the liquid electrolyte to form complexes, thereby increasing the viscosity of the liquid electrolyte. As Li salts, $(CF_3SO_2)_2NLi$, $(SO_2F)_2NLi$, $LiPF_6$, $LiClO_4$, $LiAsF_6$, $LiBF_4$, $LiB(C_6H_5)_4$, $CH_3SO_3Li$, and $CF_3SO_3Li$, or mixture thereof can be used. As Na salts and K salts, those salts of a structure in which the Li element in the Li salts described above is substituted with an Na element or a K element can be used. As the binder, polyvinylfluoride, polyvinylidenefluoride (PVDF), polytetrafluoroethylene, polyimide, styrene-butadiene rubber, or mixtures thereof can be used.

As described above, the secondary battery according to the first embodiment of the present invention has a main feature that the porous insulator 5 that can prevent both the gas stagnation and the liquid junction between the electrodes comprises insulative inorganic particles and a reaction agent for lowering the fluidity of the liquid electrolyte. The characteristic structure and a method of manufacturing the structure are to be described specifically.

Figure 3A:
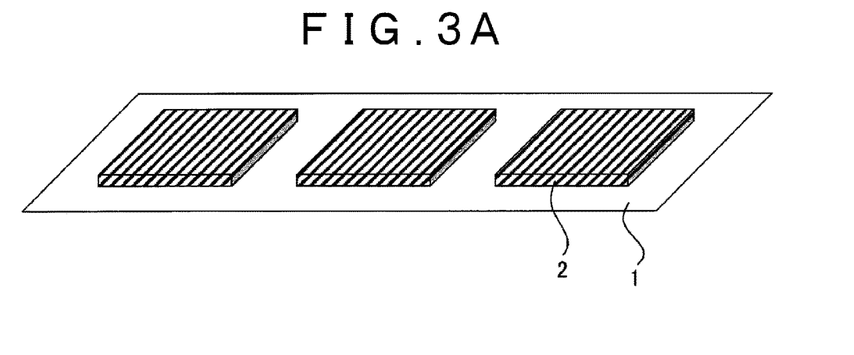

A method of manufacturing the secondary battery according to the first embodiment of the present invention is to be described with reference to FIG. 3A to FIG. 3C. First, as illustrated in FIG. 3A, a positive electrode layer 2 is intermittently coated on a stainless steel foil as the collector foil 1. The positive electrode layer 2 is prepared as described below.

As the materials of the positive electrode layer 2, a lithium manganate/cobalt nickelate composite oxide is used for the positive electrode active substance, a graphite powder is used for the conduction aid, and polyvinylidene fluoride (PVDF) is used for the binder. As the material for the semi-solid electrolyte in the positive electrode layer 2, tetraethylene glycol dimethyl ether containing $(CF_3SO_2)_2NLi$ as the electrolyte salt is used for the liquid electrolyte and a graphite powder like that for the conduction aid is used for the carrier.

The positive electrode slurry is prepared by mixing the active substance, the conduction aid (also serving as the carrier), the binder, and the liquid electrolyte are mixed and further dispersing the mixture in N-methyl-2-pyrrolidone (NMP). The positive electrode slurry is intermittently coated on the stainless steel foil as the collector foil and dried in a hot blow drying furnace at 100° C. Subsequently, the dried film is pressed to obtain the positive electrode layer.

Figure 3B:
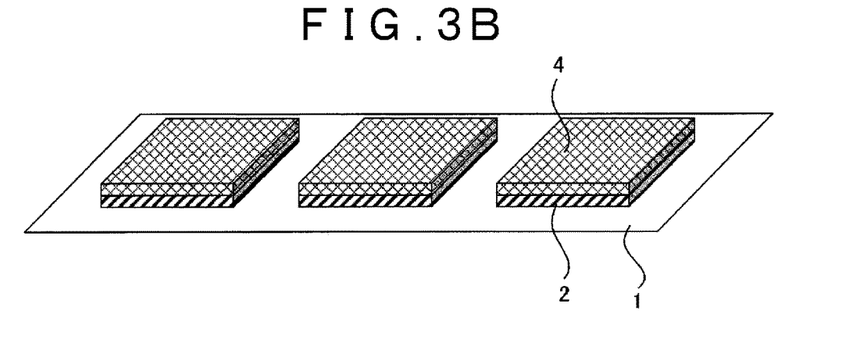

Then, as illustrated in FIG. 3B, a semi-solid electrolyte layer 4 is coated on the intermittently coated positive electrode layer 2. The semi-solid electrolyte layer 4 is prepared as described below. As the semi-solid electrolyte material, tetraethylene glycol dimethyl ether containing $(CF_3SO_2)_2NLi$ as the electrolyte salt is used for the liquid electrolyte salt and a silicon dioxide powder is used for the carrier. Polyvinylidene fluoride (PVDF) is used for the binder. The liquid electrolyte, the carrier, and the binder are mixed and they are further dispersed in N-methyl-2-pyrrolidone (NMP), thereby preparing a semi-solid electrode slurry. The semi-solid electrolyte slurry is coated on the intermittently coated positive electrode layer 2 and dried in a hot blow drying furnace at 100° C.

Figure 3C:
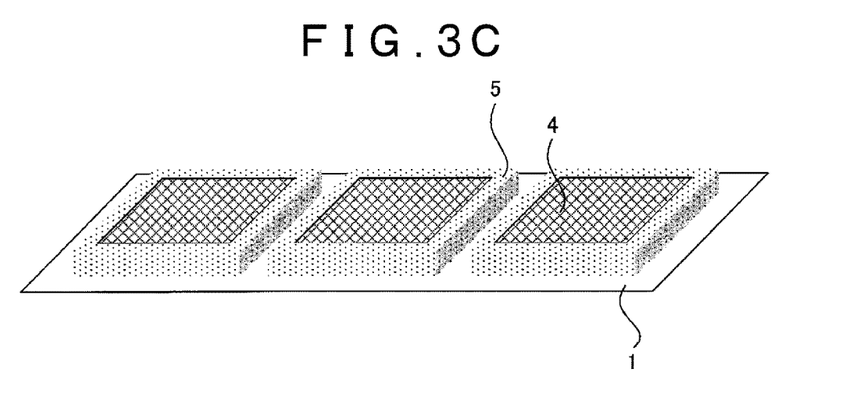

Finally, as illustrated in FIG. 3C, a porous insulator 5 is coated along peripheral four sides of the intermittently coated positive electrode layer 2 and the semi-solid electrolyte layer 4. The porous insulator 5 is prepared as described below. As the materials of the porous insulator 5, a silicon dioxide powder is used for the inorganic insulative particles, $(CF_3SO_2)_2NLi$ which is the Li salt is used for the reaction agent that lowers the fluidity of the liquid electrolyte and polyvinylidene fluoride (PVDF) is used for the binder. The inorganic insulative particles, the reaction agent and the binder are mixed and they are further dispersed in N-methyl-2-pyrrolidone (NMP) to obtain a slurry. The slurry is coated to the periphery of the intermittently coated positive electrode layer 2 and the semi-solid electrolyte layer 4 and dried in a hot blow drying furnace at 100° C.

The amount of the reaction agent incorporated in the porous insulator 5 is to be described. It is necessary that the amount of the reaction agent may satisfy the following equation 1.

Amount of reaction agent (mol)≥amount of electrolyte solvent per unit volume contained in the positive electrode layer and the semi-solid electrolyte layer $(g/mm^2)$×bleeding ratio (%)/100× volume of the positive electrode layer and the semi-solid electrolyte layer $(mm^3)$÷molecular weight of the electrolyte solvent (g/mol)  [Equation 1]

The right side of the equation 1 represents the mol number of the liquid electrolyte solvent bleeding out from the positive electrode layer 2 and the semi-solid electrolyte layer 4. When the reaction agent is incorporated in the porous insulator 5 in an amount more than that in the right side of the equation 1, bleeding of the electrolyte can be prevented thereby capable of preventing liquid junction. The bleeding ratio in the second term of the equation 1 shows the bleeding ratio of the liquid electrolyte from the positive electrode layer 2 and the semi-solid electrolyte 4. For example, when a pressure of several to several tens of MPa is applied, the bleeding ratio reaches about 5 to 15%.

The rear face of the collector foil 1 is famed in the same manner except for forming a negative electrode layer 3 instead of the positive electrode layer 2. A sheet as illustrated in FIG. 1 is obtained by punching the positive electrode layer 2 and the semi-solid electrolyte layer 4 formed by intermittent coating over the collector foil 1. In the sheet, the semi-solid electrolyte 4 is formed on the surfaces of the positive electrode layer 2, and the negative electrode layer 3 and the porous insulator 5 is formed at the periphery of the positive electrode layer 2, the negative electrode layer 3 and the semi-solid electrolyte layer 4. The secondary battery illustrated in FIG. 1 is completed as described above.

Upon punching, it is necessary to punch the sheet such that the porous insulator 5 is arranged along the four sides at the periphery of the sheet. Then, the punched sheets are stacked serially, the periphery of the stack is covered by an outer casing 6 and the electrode terminals 11 are led out. Thus, a secondary battery in which the bipolar batteries are stacked in plurality as illustrated in FIG. 2 is obtained.

Figure 4:
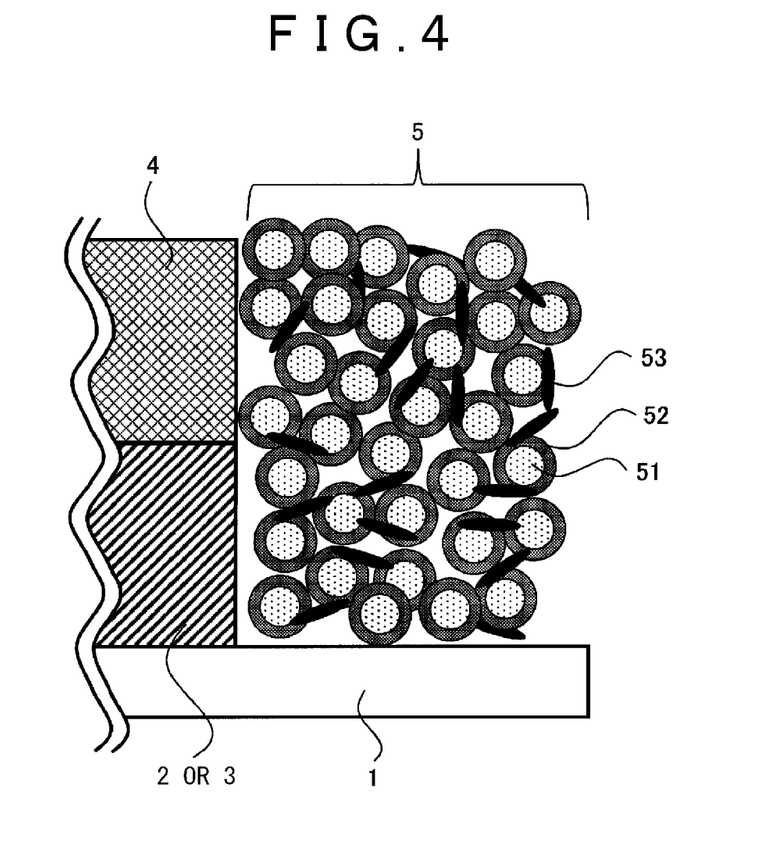
FIG. 4 is a schematic cross sectional view illustrating a detailed structure of a porous insulator forming a secondary battery according to the first embodiment of the present invention.

Then, the detailed structure of the porous insulator 5 as a constituent component of the secondary battery according to the first embodiment is to be described with represent to FIG. 4. FIG. 4 illustrates an example of forming the porous insulator 5 at the periphery of the bipolar battery manufactured by laminating the positive electrode layer 2 or the negative electrode layer 3 and the semi-solid electrolyte layer 4 over the collector foil 1 as illustrated in FIG. 3A to FIG. 3C.

As described above, the porous insulator 5 can prevent both the gas stagnation and the liquid junction between the electrodes. The porous insulator 5 has a structure in which inorganic insulative particles 51 each coated with a reaction agent 52 are closely bonded to each other by a binder 53.

First, a method of coating the inorganic insulative particles 51 with the reaction agent 52 is to be described. As described above, when porous insulator 5 is prepared, the inorganic insulative particles 51, the reaction agent 52, and the binder 53 are mixed and the mixture is dispersed in N-methyl-2-pyrrolidone (NMP) and slurrified. In this process, the reaction agent 52 is dissolved in NMP. Subsequently, the slurry is coated and dried. In the drying only NMP is evaporated. The inorganic insulative particles 51 are covered with the reaction agent 52 by precipitation of the reaction agent 52 on the surface of the inorganic insulative particles 51 along with evaporation of NMP.

Then, the mechanism in which the porous insulator 5 can prevent both the gas stagnation and the liquid junction between the electrodes is to be described. As illustrated in FIG. 4, the porous insulator 5 has the inorganic insulative particles 51 as the skeleton in which fine pores are present between each of the particles. Even when liquid electrolyte bleeding from the positive electrode layer 2, the negative electrode layer 3, and the semi-solid electrolyte layer 4 intrudes to the porous insulator 5, the inorganic insulative particles 51 are not swollen. Accordingly, even when the gas evolves between the electrodes, the gas can be discharged and gas stagnation can be prevented.

Further, if the liquid electrolyte bleeding from the positive electrode layer 2, the negative electrode layer 3, and the semi-solid electrolyte layer 4 intrudes into the porous insulator 5, the liquid is in contact with the reaction agent 52 coating the inorganic insulative particles 51. In this case, cations contained in the reaction agent interact with the organic solvent molecules to form complexes, thereby increasing the viscosity of the liquid electrolyte intruding into the porous insulator 5. Accordingly, the fluidity of the bleeding liquid electrolyte is lowered and the electrolyte can no more move in the fine pores present in the porous insulator 5. In this way, the liquid leakage can be prevented and the liquid junction can be prevented.

Second Embodiment

Then, a second embodiment of the present invention is to be described with reference to FIG. 5A to FIG. 5C and FIG. 6. The secondary battery according to the second embodiment of FIG. 6 is different from the secondary battery according to the first embodiment in that the semi-solid electrolyte layer 4 is famed not only at the surface of the positive electrode layer 2 and the negative electrode layer 3 but also on the lateral sides of the positive electrode layer 2 and the negative electrode layer 3. Since other configurations are identical with those of the secondary battery according to the first embodiment illustrated in FIG. 1, description of other configurations are omitted.

Figure 5A:
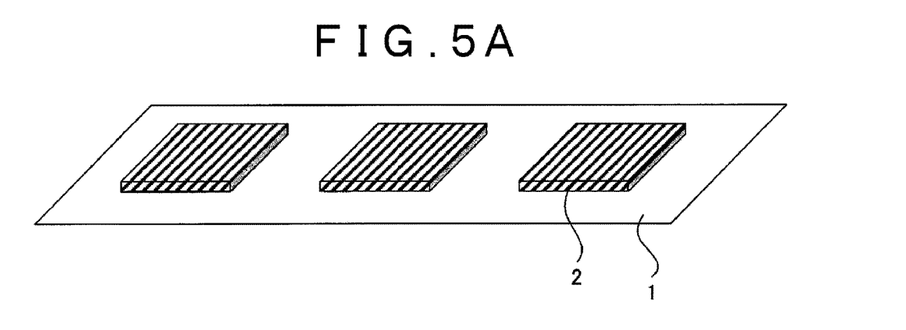
Figure 5B:
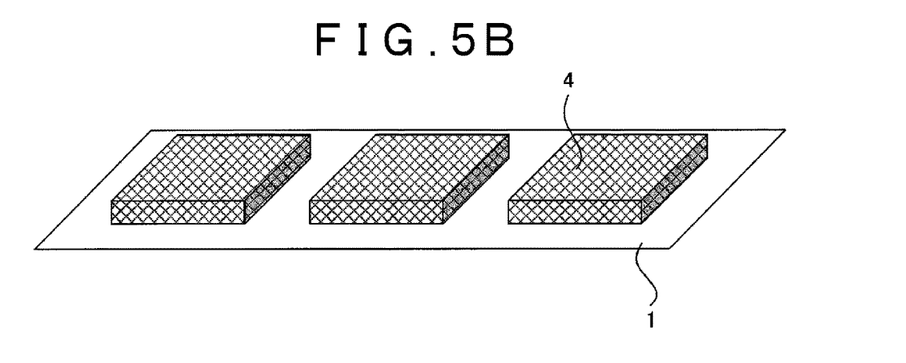
Figure 5C:
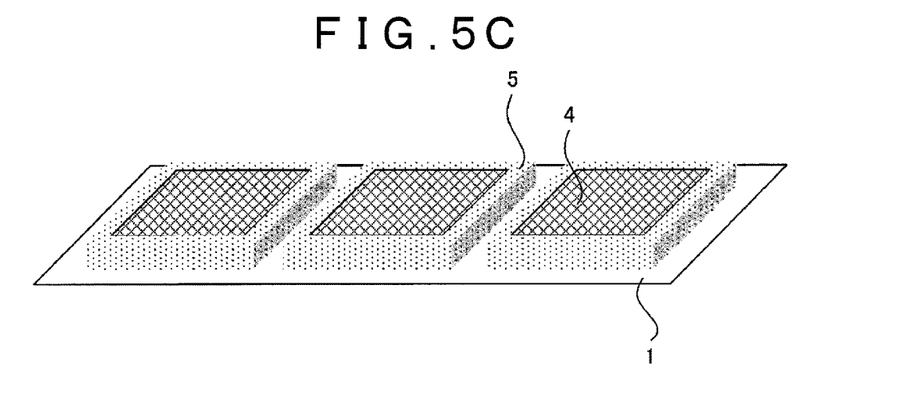
Figure 6:
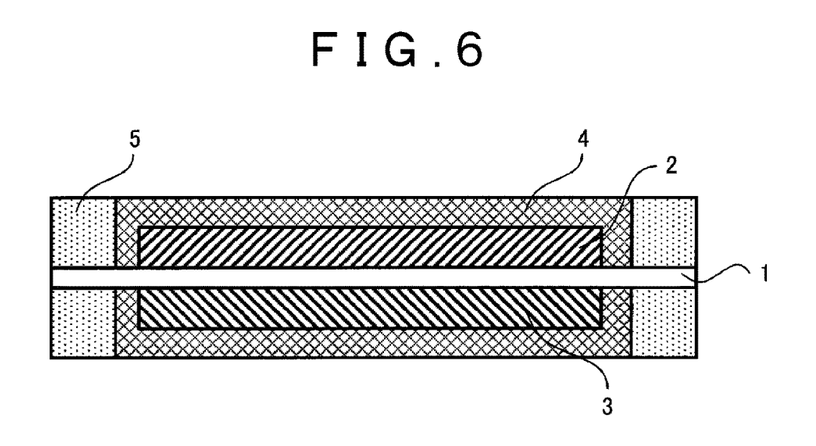
FIG. 6 is a schematic cross sectional view illustrating the configuration of the secondary battery according to the second embodiment of the present invention.

With reference to FIG. 5A to FIG. 5C, a method of manufacturing the secondary battery according to the first embodiment is to be described. First, as illustrated in FIG. 5A, a positive electrode layer 2 is intermittently coated on a stainless steel foil which is the collector foil 1 in the same manner as in FIG. 3A.

Then, a semi-solid electrolyte slurry is prepared by the same method as that of the first embodiment. This is different from the method of the first embodiment shown in FIG. 3B in that the semi-solid electrolyte slurry is coated so as to coat not only the intermittently coated surface of the positive electrode layer 2 but also the lateral side of the electrode 2 and dried in a hot blow furnace at 100° C. in FIG. 5B.

Finally, as illustrated in FIG. 5C, a slurry of the porous insulator 5 is prepared by the same method as that of the first embodiment. Thus, the porous insulator 5 coated along the four sides at the periphery of the semi-solid electrolyte layer 4 is obtained. The rear face of the collector foil 1 is prepared in the same manner except for forming the negative electrode layer 3 instead of the positive electrode layer 2.

Thus, a sheet as illustrated in FIG. 6 is obtained by punching the positive electrode 2 and the semi-solid electrolyte layer 4 formed on the collector foil 1 by intermittent coating. In the sheet, the semi-solid electrolyte layer 4 is formed not only on the surface but also along the lateral side of the positive electrode layer 2 and the negative electrode layer 3. Then, the porous insulator 5 is formed at the periphery of the positive electrode layer 2, the negative electrode layer 3, and the semi-solid electrolyte layer 4. Thus, a secondary battery illustrated in FIG. 6 is completed.

In the same manner as in the first embodiment, it is necessary upon punching to punch such that the porous insulator 5 is famed on the four sides at the periphery of the sheet. Then, the punched sheets are stacked in series and covered at the periphery with the outer casing 6, and the electrode terminals 11 are led out. Thus, a secondary battery comprising bipolar batteries stacked in plurality as shown in FIG. 2 is obtained.

As described above, the secondary battery according to the preferred embodiment of the present invention includes a bipolar electrode in which a positive electrode layer 2 is famed on one surface and the negative electrode layer 3 is formed on the other surface of a collector foil 1, an electrolyte layer 4 formed at least on the surface of at least one of the positive electrode layer 2, and the negative electrode layer 3, and porous insulator 5 formed on the lateral surface of at least one of the positive electrode layer 2, the negative electrode layer 3, and the electrolyte layer 4. Then, the electrolyte layer 4 is laminated by at least one layer to the bipolar electrode to configure the bipolar battery. The porous insulator 5 includes inorganic particles 51 and a reaction agent 52 for lowering the fluidity of the liquid electrolyte bleeding from the electrolyte layer 4.

According to the embodiment of the present invention, thermal deformation of the porous insulator 5 can be prevented by using the inorganic insulative particles 51 as the skeleton material and lowering of the gas discharge performance can be prevented. Further, liquid leakage can be prevented by increasing the viscosity and lowering the fluidity of the bleeding liquid electrolyte by the reaction agent 52 contained in the porous insulator 5. In this way, both the gas stagnation and the liquid junction can be prevented to improve the reliability.

While the invention accomplished by the present inventors has been described specifically based on the preferred embodiments thereof, it will be apparent that the present invention is no way restricted to the preferred embodiments but can be modified variously within a range not departing from the gist thereof. For example, the technical idea of the present invention regarding the bipolar battery has been described for the lithium ion battery as the example, the technical idea of the present invention is not restricted to the lithium ion battery but is applicable generally to electric storing devices having a positive electrode, a negative electrode, and a separator electrically separating the positive electrode and the negative electrode (for example, cells or capacitors).

What is claimed is:

1. A secondary battery comprising:
    a bipolar electrode including a positive electrode layer formed on one surface of a collector foil and a negative electrode formed on the other surface of the collector foil,
    an electrolyte layer framed at least on a surface of at least one of the positive electrode layer and the negative electrode layer, and
    a porous insulator formed to a lateral surface of at least one of the positive electrode layer, negative electrode layer and the electrolyte layer,
    wherein the electrolyte layer is laminated to configure a bipolar battery,
    wherein the porous insulator includes a plurality of inorganic particles and a reactive agent,
    wherein the reactive agent coats the inorganic particles,
    wherein the inorganic particles are bonded to each other by a binder, and
    wherein the reactive agent lowers a fluidity of the liquid electrolyte bleeding from the electrolyte layer.

2. The secondary battery according to claim 1,
    wherein the reactive agent forms a complex together with a solvent molecule in the liquid electrolyte.

3. The secondary battery according to claim 1, wherein the inorganic particles comprise a skeleton material that has an insulative property and the inorganic particles prevents thermal deformation of the porous insulator.

4. The secondary battery according to claim 1,
    wherein the reactive agent includes at least one of Li salts, Na salts, and K salts.

5. The secondary battery according to claim 4,
    wherein the Li salts include at least one of $(CF_3SO_2)_2NLi$, $(SO_2F)_2NLi$, $LiPF_6$, $LiClO_4$, $LiAsF_6$, $LiBF_4$, $LiB(C_6H_5)_4$, $CH_3SO_3Li$, and $CF_3SO_3Li$.

6. The secondary battery according to claim 1,
    wherein a plurality of the bipolar batteries are stacked, and the porous insulator is disposed between a pair of the conduction foils of a pair of the bipolar batteries arranged vertically.

7. The secondary battery according to claim 1,
    wherein each of the positive electrode layer and the negative electrode layer has both a surface and a lateral side, and
    wherein the electrolyte layer is formed on both the surface and the lateral side of at least one of the positive electrode layer and the negative electrode layer.

* * * * *